US011374958B2

(12) United States Patent
Ngo et al.

(10) Patent No.: US 11,374,958 B2
(45) Date of Patent: Jun. 28, 2022

(54) SECURITY PROTECTION RULE PREDICTION AND ENFORCEMENT

(71) Applicant: International Business Machines Corporation, Armonk, NY (US)

(72) Inventors: Huyanh D. Ngo, Sterling Heights, MI (US); Aankur Bhatia, Bethpage, NY (US); Adam J. Paquin, Suwanee, GA (US); Srinivas B. Tummalapenta, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 16/176,785

(22) Filed: Oct. 31, 2018

(65) Prior Publication Data

US 2020/0137103 A1 Apr. 30, 2020

(51) Int. Cl.
*H04L 9/40* (2022.01)
*G06N 3/08* (2006.01)
(Continued)

(52) U.S. Cl.
CPC ............ *H04L 63/1433* (2013.01); *G06F 8/65* (2013.01); *G06F 21/577* (2013.01); *G06F 40/30* (2020.01); *G06N 3/08* (2013.01); *H04L 63/10* (2013.01)

(58) Field of Classification Search
CPC ..... H04L 63/1433; H04L 63/10; H04L 63/14; G06F 40/30; G06F 40/40; G06F 40/20; G06F 8/65; G06F 21/577; G06N 3/08
(Continued)

(56) References Cited

U.S. PATENT DOCUMENTS 6,829,604 B1  12/2004  Tifft
7,748,040 B2 *  6/2010  Adelstein ............ H04L 63/1491
                                                      726/25
(Continued)

OTHER PUBLICATIONS

Ha Thanh Le, Using Natural Language Tool to Assist VPRG Automated Extraction from Textual Vulnerability Description, 2011 Workshops of International Conference on Advanced Information Networking and Applications (Year: 2011).*

(Continued)

*Primary Examiner* — Kambiz Zand
*Assistant Examiner* — Mahabub S Ahmed
(74) *Attorney, Agent, or Firm* — Law Office of Jim Boice

(57) ABSTRACT

A method provides an intermediate mitigation of a vulnerability in a particular computer system. One or more processors receive a description of a vulnerability of a computer system to a malicious attack. The processor(s) perform an NLP analysis of the description of the vulnerability in order to extract risk information related to the vulnerability, where the risk information includes an identity of a type of vulnerable computer system resource in the computer system. The processor(s) match the vulnerable computer system resource to a computer system resource in a particular computer system, and perform an intermediate mitigation action that reduces a functionality of the computer system resource in the particular computer system until a solution is implemented that both restores the functionality of the computer system resource in the particular computer system and mitigates the vulnerability of the particular computer system to the malicious attack.

16 Claims, 11 Drawing Sheets

(51) Int. Cl.
*G06F 8/65* (2018.01)
*G06F 21/57* (2013.01)
*G06F 40/30* (2020.01)

(58) Field of Classification Search
USPC .................................................. 726/22–25
See application file for complete search history.

(56) References Cited

U.S. PATENT DOCUMENTS

| | | | |
|---|---|---|---|
| 8,122,499 B2* | 2/2012 | Hall .................... | G07F 17/0014 709/224 |
| 9,721,097 B1* | 8/2017 | Davis ................... | G06N 3/0454 |
| 10,015,186 B1* | 7/2018 | Tamir ................... | G06F 21/577 |
| 10,140,453 B1* | 11/2018 | Fridakis ................ | G06F 21/577 |
| 10,185,924 B1* | 1/2019 | McClintock .......... | G06F 21/577 |
| 10,205,717 B1* | 2/2019 | Shah ..................... | G06F 21/53 |
| 10,250,619 B1* | 4/2019 | Park ..................... | G06F 21/552 |
| 10,333,953 B1* | 6/2019 | Averbuch .............. | G06F 21/554 |
| 10,462,176 B2* | 10/2019 | Tamir ................... | H04L 63/1441 |
| RE47,757 E* | 12/2019 | Hering ................. | G06F 21/577 |
| 10,652,266 B1* | 5/2020 | Tautschnig ........... | H04L 63/1433 |
| 10,834,120 B2* | 11/2020 | Satish ................. | H04L 63/1441 |
| 10,893,066 B1* | 1/2021 | Oliphant ............. | H04L 63/1441 |
| 2004/0215978 A1* | 10/2004 | Okajo ................. | H04L 63/0227 726/1 |
| 2005/0091542 A1* | 4/2005 | Banzhof ............... | G06F 21/577 726/4 |
| 2005/0235360 A1* | 10/2005 | Pearson ............... | H04L 67/34 726/23 |
| 2006/0191010 A1* | 8/2006 | Benjamin ............. | G06F 21/552 726/23 |
| 2007/0143851 A1* | 6/2007 | Nicodemus ........... | G06F 21/577 726/4 |
| 2008/0282313 A1 | 11/2008 | Diaz-Cuellar et al. | |
| 2012/0304300 A1* | 11/2012 | LaBumbard .......... | G06F 21/577 726/25 |
| 2013/0204821 A1* | 8/2013 | Keith, Jr. ............. | G06F 11/26 706/46 |
| 2013/0239177 A1* | 9/2013 | Sigurdson ............ | H04L 63/102 726/4 |
| 2013/0247205 A1* | 9/2013 | Schrecker ............ | G06F 21/577 726/25 |
| 2014/0007238 A1 | 1/2014 | Magee et al. | |
| 2014/0172417 A1* | 6/2014 | Monk, II ............. | G06F 40/30 704/9 |
| 2014/0173739 A1* | 6/2014 | Ahuja ................. | H04L 63/1433 726/25 |
| 2014/0201836 A1* | 7/2014 | Amsler ............... | H04L 63/20 726/23 |
| 2015/0040232 A1* | 2/2015 | Oliphant ............. | H04L 63/0281 726/25 |
| 2015/0100345 A1 | 4/2015 | Holmes et al. | |
| 2015/0163242 A1* | 6/2015 | Laidlaw .............. | G06N 7/023 726/22 |
| 2015/0242635 A1* | 8/2015 | Li ........................ | G06F 21/554 726/25 |
| 2015/0242637 A1* | 8/2015 | Tonn ................... | H04L 63/1441 726/25 |
| 2016/0065599 A1* | 3/2016 | Hovor ................. | G06F 16/338 726/23 |
| 2016/0071517 A1* | 3/2016 | Beaver ................ | G06F 40/35 704/9 |
| 2016/0173529 A1 | 6/2016 | Baig et al. | |
| 2017/0034023 A1* | 2/2017 | Nickolov ............ | H04L 43/0817 |
| 2017/0116204 A1* | 4/2017 | Davulcu .............. | G06F 16/355 |
| 2017/0220964 A1* | 8/2017 | Datta Ray .......... | G06Q 10/0635 |
| 2017/0243009 A1* | 8/2017 | Sejpal ................. | G06F 21/577 |
| 2017/0286682 A1* | 10/2017 | Stappert .............. | G06F 21/577 |
| 2018/0034840 A1 | 2/2018 | Marquardt et al. | |
| 2018/0063168 A1* | 3/2018 | Sofka ................. | G06N 3/0454 |
| 2018/0124095 A1* | 5/2018 | Hamdi ............... | G06F 12/0868 |
| 2018/0159890 A1* | 6/2018 | Warnick ............. | H04L 63/1466 |
| 2018/0205755 A1* | 7/2018 | Kavi .................. | H04L 63/1433 |
| 2018/0219908 A1* | 8/2018 | Tamir ................. | H04L 63/1441 |
| 2018/0248895 A1* | 8/2018 | Watson .............. | G06Q 20/4016 |
| 2018/0351987 A1* | 12/2018 | Patel ................. | G06F 21/577 |
| 2019/0050579 A1* | 2/2019 | Abraham ............ | G06F 16/34 |
| 2019/0052665 A1* | 2/2019 | Mahieu .............. | G06N 3/04 |
| 2019/0052676 A1* | 2/2019 | Giokas .............. | H04W 12/08 |
| 2019/0081980 A1* | 3/2019 | Luo ................... | G06N 7/005 |
| 2019/0089722 A1* | 3/2019 | Ciocarlie .......... | H04L 67/22 |
| 2019/0166151 A1* | 5/2019 | Bulut ................ | H04L 63/1433 |
| 2019/0188212 A1* | 6/2019 | Miller ............... | G06N 20/00 |
| 2019/0190926 A1* | 6/2019 | Choi ................. | H04L 63/1416 |
| 2019/0238584 A1* | 8/2019 | Somasundaram .. | H04L 63/1433 |
| 2019/0273509 A1* | 9/2019 | Elkind .............. | G06N 3/08 |
| 2019/0273510 A1* | 9/2019 | Elkind .............. | G06N 20/00 |
| 2019/0273733 A1* | 9/2019 | Kawabata .......... | G06F 21/31 |
| 2019/0303437 A1* | 10/2019 | Guarnieri .......... | G06F 40/253 |
| 2019/0312839 A1* | 10/2019 | Grimm .............. | H04L 63/0876 |
| 2019/0325134 A1* | 10/2019 | Gronát .............. | G06N 3/084 |
| 2019/0327259 A1* | 10/2019 | DeFelice ........... | H04L 63/1433 |
| 2019/0347155 A1* | 11/2019 | Chevalier .......... | G06F 11/0778 |
| 2019/0379863 A1* | 12/2019 | Overby .............. | H04L 67/322 |
| 2020/0007570 A1* | 1/2020 | Lam .................. | H04L 63/10 |
| 2020/0011784 A1* | 1/2020 | Chalumuri ......... | G06Q 10/20 |
| 2020/0012796 A1* | 1/2020 | Trepagnier ......... | G06N 20/00 |
| 2020/0042370 A1* | 2/2020 | Kao .................. | G06K 9/6223 |
| 2020/0057850 A1* | 2/2020 | Kraus ................ | G06N 3/08 |
| 2020/0110882 A1* | 4/2020 | Ripolles Mateu .. | G06F 16/353 |
| 2020/0120128 A1* | 4/2020 | Tamir ................ | H04L 63/1433 |
| 2020/0134179 A1* | 4/2020 | Nilangekar ........ | G06F 16/951 |
| 2020/0272743 A1* | 8/2020 | Song ................. | G06F 21/577 |

OTHER PUBLICATIONS

Mansour Sheikhan, Intrusion detection using reduced-size RNN based on feature grouping, springer (Year: 2012).*

P. Mell et al., "The NIST Definition of Cloud Computing", National Institute of Standards and Technology, Information Technology Laboratory, Sep. 2011, pp. 1-7.

* cited by examiner

US 11,374,958 B2

SECURITY PROTECTION RULE PREDICTION AND ENFORCEMENT

BACKGROUND

The present invention relates to the field of protecting computer resources from malicious electronic attacks. Still more particularly, the present invention relates to the field of identifying vulnerabilities to computer resources and providing an intermediate measure against potential malicious attacks until the vulnerabilities are resolved.

SUMMARY

In an embodiment of the present invention, a method provides an intermediate mitigation of a vulnerability in a particular computer system. One or more processors receive a description of a vulnerability of a computer system to a malicious attack. The processor(s) perform a Natural Language Processing (NLP) analysis of the description of the vulnerability in order to extract risk information related to the vulnerability, where the risk information includes an identity of a type of vulnerable computer system resource in the computer system that is vulnerable to the malicious attack. The processor(s) compare the vulnerable computer system resource to a computer system resource in a particular computer system. In response to the vulnerable computer system resource matching the computer system resource in the particular computer system, the processor(s) perform a mitigation action that mitigates a vulnerability of the computer system resource in the particular computer system to the malicious attack by reducing a functionality of the computer system resource in the particular computer system until a solution is implemented that both restores the functionality of the computer system resource in the particular computer system and mitigates the vulnerability of the particular computer system to the malicious attack.

In one or more embodiments, the method(s) described herein are performed by an execution of a computer program product and/or a computer system.

DETAILED DESCRIPTION

Figure 1:
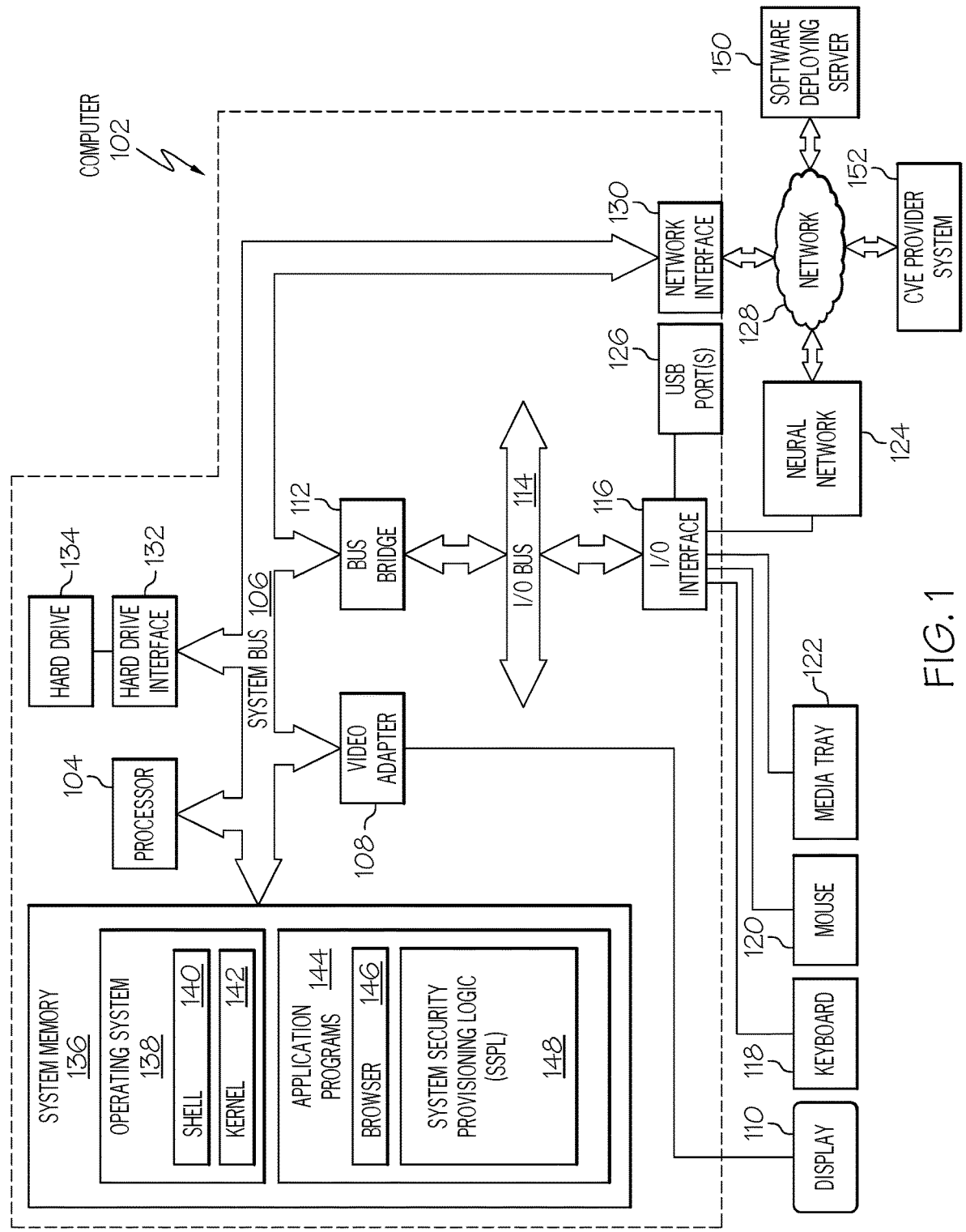
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by neural network 124 and/or software deploying server 150 and/or Common Vulnerability Exposure (CVE) provider system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the CVE provider system 152 and/or the neural network 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a System Security Provisioning Logic (SSPL) 148. SSPL 148 includes code for implementing the processes described below, including those described in FIGS. 2-8. In one embodiment, computer 102 is able to download SSPL 148 from software deploying server 150, including in an on-demand basis, wherein the code in SSPL 148 is not downloaded until needed for execution. Note further that, in one embodiment of the present invention, software deploying server 150 performs all of the functions associated with the present invention (including execution of SSPL 148), thus freeing computer 102 from having to use its own internal computing resources to execute SSPL 148.

Also connected to (or alternatively, as part of) computer 102 is a neural network 124. In exemplary embodiments of the present invention, neural network 124 is a traditional neural network (see FIG. 7), a convolutional neural network, or another type of heuristic artificial intelligence.

Also connected to (or alternatively, as part of) computer 102 is a Common Vulnerability Exposure (CVE) provider system 152, which is a system used by an organization that notifies computer 102 of newly-discovered vulnerabilities to computer resources, including computer networks, routers, storage devices, computing systems, etc.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As used in the present patent application, a "weakness" to a computer resource is defined as a feature in the computer resource that makes it vulnerable to malicious actions. For example, a new software version may not protect a particular port in a network router, thus making this particular port "weak". As such, a Common Weakness Enumeration (CWE) is a standard used to describe such identified/discovered weaknesses.

As used in the present patent application, a "vulnerability" is defined as a specific vulnerability of a computer resource caused by the weakness. For example, if a new software version does not protect a particular port in a network router, then the particular port is vulnerable to malicious attacks, thus making that particular port open to attacks ("vulnerable"). As such, a Common Vulnerability Exposure (CVE) is a standard used to describe such specifically identified/discovered vulnerabilities.

Security service vendors provide Network Protection, Host Based Protection and Vulnerability Assessment services to clients worldwide. However, from the time a vulnerability (CVE) is detected to the time a patch is released by the security service vendor for application to affected products, a significant time elapses (30-60 days) leaving customers exposed to a variety of attacks targeting the identified vulnerability.

Thus, one or more embodiments of the present invention present a new method using natural language processing techniques to parse newly released CVEs, and extract vendor, product and network information (port, protocols) in order to create an intermediate mitigation process. In one or more embodiments, the present invention utilizes a supervised machine learning method (e.g., a neural network) to automatically scan customer profiles, generate new protection rules, and enforce these rules across all affected customers to block malicious traffic and prevent likely attacks.

More specifically and as described herein, one or more embodiments of the present invention protect customer environments between the time a CVE is released and the time that the vendor is able to provide a patch to close the vulnerability. It does this by an intermediate measure that is derived by applying policy enforcement changes based on CVE data that is collected in near real time. The solution involves the use of natural language processing of CVE databases to evaluate the risk, scope and exploit vector of the CVE. This information is then used to automate changes inside a customer's computer resources to protect them (in an intermediate manner) from the exposure that this vulnerability presents. Such intermediate changes to the customer's computer resources (e.g., a network) include, but are not limited to, limiting what devices/parties (if any) are allowed to access the vulnerable resource, change signatures (e.g., passwords) required to access the vulnerable resource, change what agents of the host are allowed to access the vulnerable resource, changing the software and/or hardware configuration of the vulnerable resource, applying a temporary patch that limits and/or stops access to the vulnerable resource, etc.

As described herein, one or more embodiments of the present invention uses analytics that use a combination of Common Vulnerability Exposure (CVE) data, Common Weakness Enumeration (CWE) data, Natural Language Processing (NLP), and/or customer profiles to quickly identify the potential security risk. The present invention then compiles a policy modification based on taxonomy suitable for the particular device model and version that is vulnerable to a malicious attack, and automatically enforces a protection rule on behalf of the customer. This remediation is then rolled back after fully-vetted (tested) patching has been applied and the exposure is no longer present.

As such, the present invention saves hundreds of labor hours needed to enforce protection from vulnerabilities for customers as compared to the prior art. Furthermore, the present invention improves the quality of the security services by providing customers with real time solutions to emerging vulnerabilities within their environments.

Reactive vulnerability mitigation described herein through natural human language processing CVE and CWE information and its use to drive enforcement of changes within a customer's protection platform is not found in the prior art, and thus improves the functionality of computer resources by protecting them from malicious attacks in a manner that is significantly more than what is found in the prior art.

Figure 2:
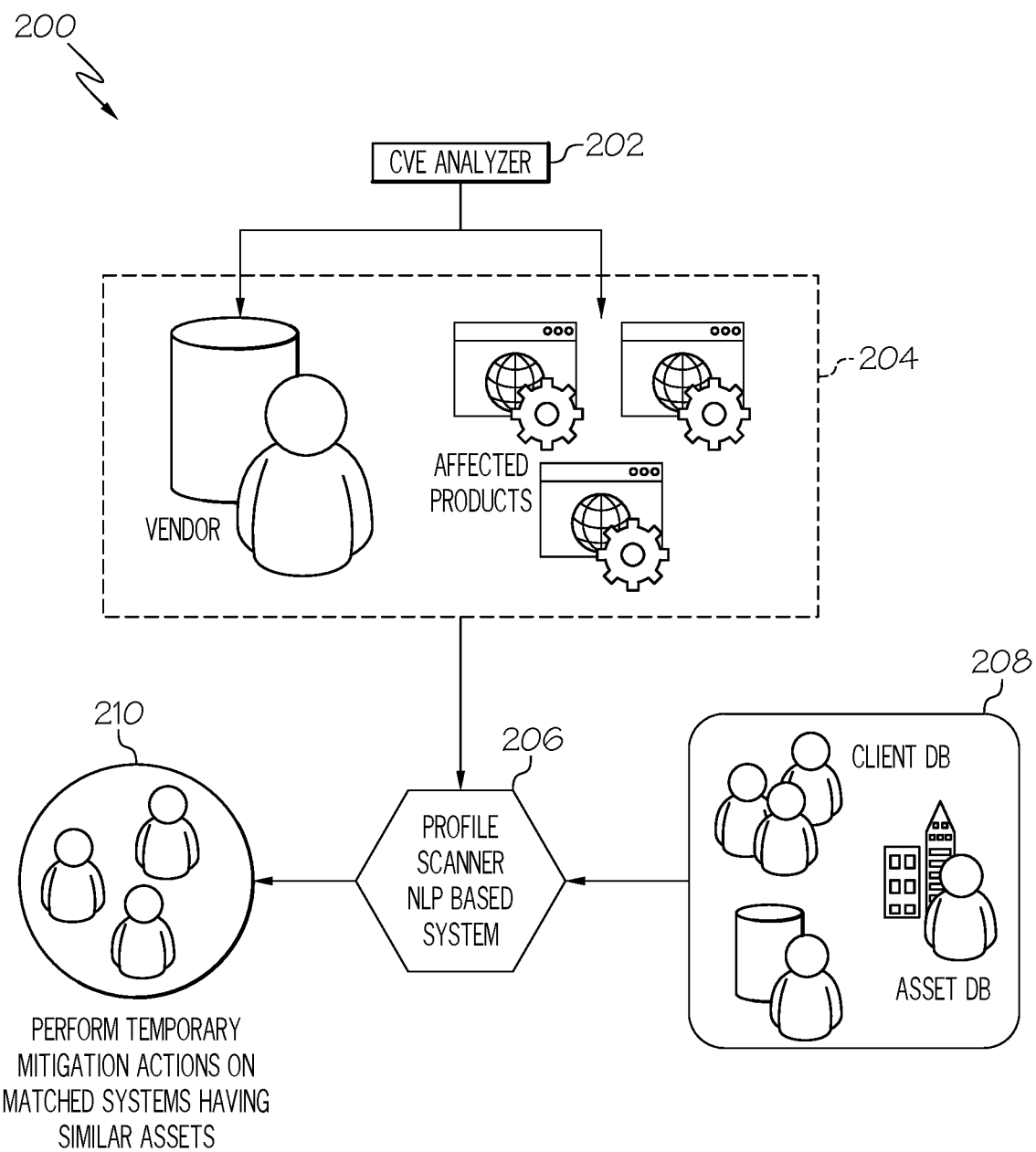
FIG. 2 illustrates a high-level overview of one or more embodiments of the present invention.

With reference now to FIG. 2, a high-level overview of one or more embodiments of the present invention is depicted in graph 200.

As shown in graph 200, a Common Vulnerability Exposure (CVE) analyzer 202 analyzes a newly-discovered vulnerability (e.g., a CVE) of a computer resource, such as a network, storage system, etc. This analysis includes information about the identity of the vendor that has created the vulnerability (e.g., a software vendor), as well as what particular products are affected, as shown in block 204. For example, assume that a software vendor creates a new version of Operating System A, called Version A2. Assume further that applications that run on Operating System A include a word processing program W, an email program E, a spreadsheet program S, etc. However, Version A2 of Operating System has a flaw (e.g., a CWE weakness), which allows hackers to steal data from one or more of the word processing program W, an email program E, a spreadsheet program S, etc. This weakness results in a vulnerability (e.g., a CVE) in the Operating System A, which is detected and analyzed by the CVE analyzer 202.

Once the vendor who created the weakness/flaw/vulnerability and the affected products are identified, a search is conducted for any systems that are affected. As shown in block 206, this search is performed using a Natural Language Processing (NLP) based system to scan profiles of various clients and assets shown in block 208.

For example, assume that the CVE analyzer 202 has determined that a particular software vendor's new version of its operating system causes a vulnerability to particular software applications that are running on certain networks. The profile scanner shown in block 206 uses NLP to identify all customer systems that 1) use that new version of the operating system to support 2) those particular software applications that are running on 3) those certain networks by comparing the output of the CVE analyzer 202 to the information in block 208. When a match is found between the vulnerable computer resources and the customer's resources in block 206, temporary mitigation actions on matched systems having similar assets/features are performed, as shown in block 210.

Figure 3A:
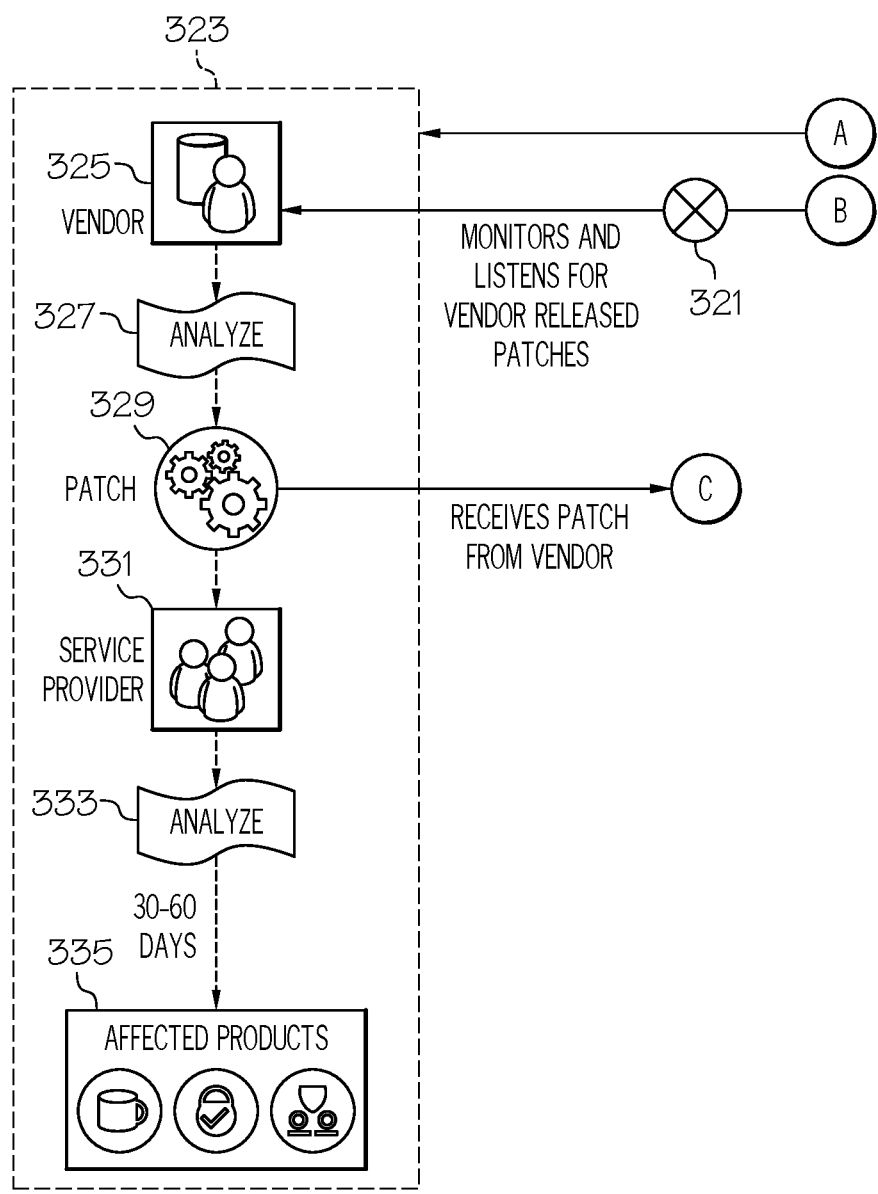
FIGS. 3A-3B depicts a detailed overview of one or more embodiments of the present invention.
Figure 3B:
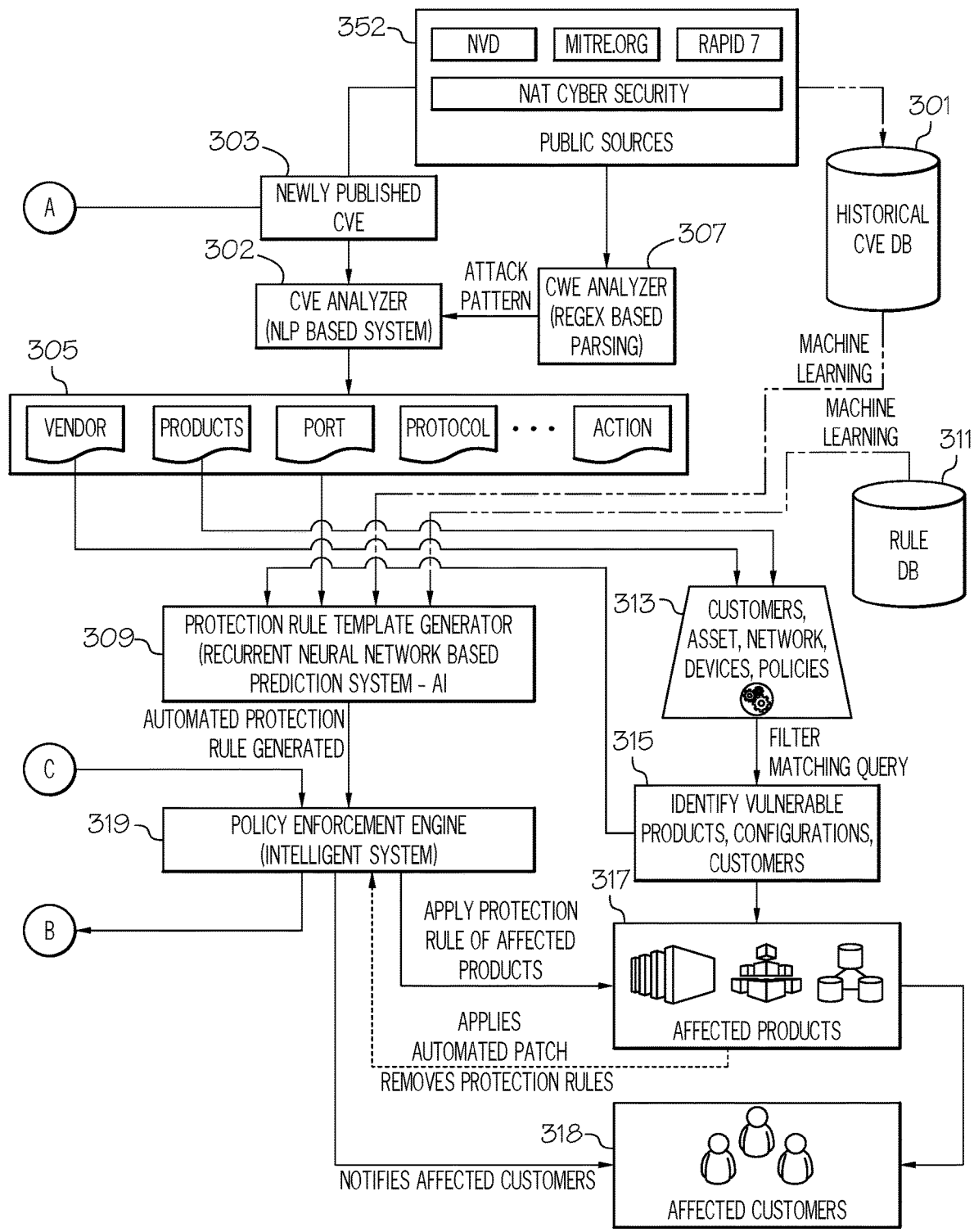

With reference now to FIGS. 3A-3B, a more detailed view of one or more embodiments of the present invention is presented.

As shown in CVE provider system 352 (analogous to CVE provider system 152 shown in FIG. 1), various public sources watch for and identify new CVE's (i.e., system vulnerabilities to malicious attack). These newly-identified CVE's are not only stored in a historical CVE database 301, but are also sent as a newly published CVE 303 to a CVE analyzer 302 (analogous to CVE analyzer 202 shown in FIG. 2).

CVE analyzer 302 continuously detects new CVE's coming from the CVE provider system 352, and uses Natural Language Processing (NLP) to determine which vendor, products, ports, protocols, etc. are affected by the new CVE's, and or what actions/impacts the CVE's have on the affected computer resources (block 305). In order to determine what resources are affected and how, the CVE analyzer 302 takes an attack pattern from a CWE analyzer 307, which uses regular expression (regex) parsing of CWEs identified by the public sources in the CVE provider system 352. That is, the CVE provider system 352 not only identifies vulnerabilities (CVE) caused by a new product, etc., but also identifies weakness (CWE) in the product and/or the systems it affects. As such, the CWE is parsed out (split into various descriptive terms) to identify where the weakness in the system lies, thus enabling the CWE analyzer 307 to predict what type of malicious attack pattern is likely. For example, if the CWE analyzer 307 determines that a particular weakness makes a particular network port unprotected from messages from known malicious Internet Protocol (IP) addresses, then the CWE analyzer 307 determines that a likely attack (e.g., a virus) will come from these known malicious IP addresses. Thus, the CWE analyzer 307 uses natural language processing to reverse engineer a CWE document in order to figure out the attack pattern for a given CVE. Thus, the output of the CWE analyzer 307 is a list of CWE attributes that aids the CVE analyzer 302 in identifying the computer resources that are affected by the newly-identified CVE.

Thus, the information found in block 305 is derived from a service provider customer profile scan that takes an output from CVE analyzer 302 to identify the name of the computer resource vendor that is affected by the vulnerability, the name of the affected product, etc. (see block 313), and scans through the security service provider's customer configuration data (e.g., names of its customers networks, sites, devices, assets, etc.) to identify the affected customer and its resources that are vulnerable for this CVE attack (as shown in block 315). This leads to a list of affected products/resources (block 317) and vulnerable/affected customers (block 318), who have a network or device that is vulnerable to a given CVE.

The information from block 305 is then sent to a protection rule template generator 309. In one or more embodiments of the present invention, the protection rule template generator 309 also receives CVE information from the historical CVE database 301 and/or a rule database 311 of previously generated rule templates for responding to CVE's, such that previously generated rule templates are reused if appropriate.

The protection rule template generator 309 uses natural language against CVE descriptions from block 305 to extract the CVE type and/or CWE information related to the newly-identified vulnerability (as discovered by the CVE provider system 352). The protection rule template generator 309 generates a protection rule template based on the taxonomy applicable to the device suitable for that device model and version. Examples of such affected/vulnerable devices include, but are not limited to, a network, endpoint, data, compute resources, storage devices, etc.

The protection rule template generator 309 sends the automated protection rule template to a policy enforcement engine 319, which takes the automated protection rule template and generates a unique protection rule for the affected computer resource (e.g., based on vendor information, product information, etc.) and converts it into a protection rule that causes an automation call that initiates policy changes on vulnerable devices. That is, the policy enforcement engine 319 applies the unique protection rule to the corresponding affected product(s) (e.g., computer resources) shown in block 317, thus initiating a remediation process for the affected resources/product(s).

The policy enforcement engine 319 continues to monitor (as shown in monitoring block 321) the affected products shown in block 317 for patch releases, as shown in block 323.

As shown in block 323, a vendor 325 (e.g., a vendor of a software product) analyzes (block 327) the new product, either on its own, and/or based on information from the CVE provider system 152. The vendor then creates a patch 329 that corrects the new vulnerability/CVE for the product. However, before the patch 329 is deployed, it is first sent to a service provider 331, which analyzes (block 333) the patch to determine if it is effective in addressing the vulnerability/CVE, if it causes other problems in performance, security, etc. This analysis process often takes 30-60 days or longer, particularly as it must be tested against numerous affected products 335.

Once the patch 329 is deemed suitable for deployment to the affected products 317, it is sent to the policy enforcement engine 319, which 1) terminates the intermediate protection shown between policy enforcement engine 319 and block 317, and 2) applies the patch 329 to the affected products shown in block 317. The policy enforcement engine 319 then also notifies the vulnerable/affected customers shown in block 318 that the intermediate protection has been stopped, and that the "permanent" patch 329 has now been applied to the affected products 317. In one or more embodiments of the present invention, this notification is tracked through a ticketing workflow system. Once actions have been taken or noted as not needed the tooling auto-notifies the affected customers through a ticket update, email, text message, portal notification, etc.

Figure 4:
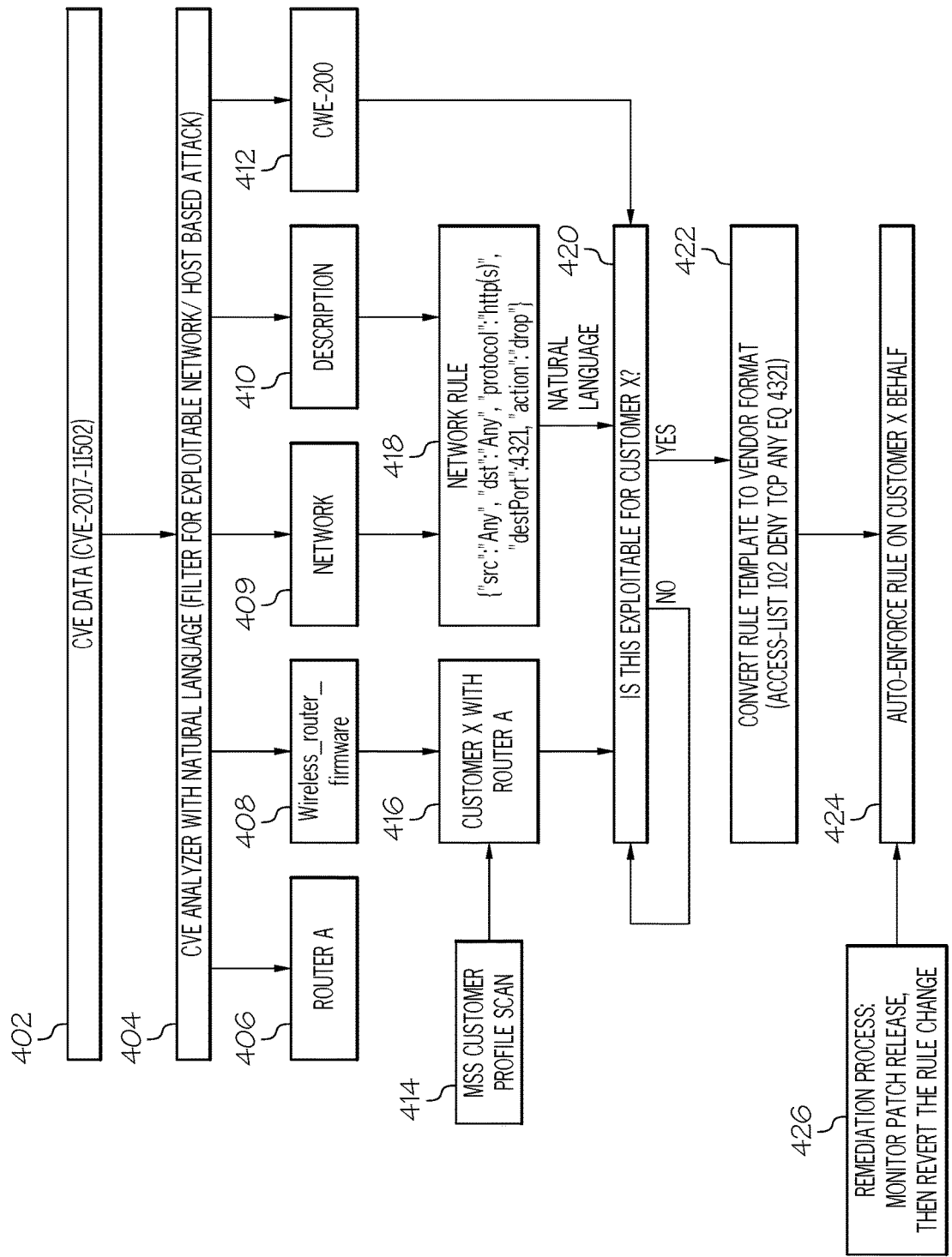
FIG. 4 illustrates additional details of the overview depicted in FIGS. 3A-3B.

With reference now to FIG. 4, additional detail of some of the process shown in FIGS. 3A-3B is presented.

As shown in block 402, a new CVE is released by a public source (e.g., CVE provider system 352 shown in FIG. 3B). This new CVE is ingested by a CVE analyzer (e.g., CVE analyzer 302 shown in FIG. 3B).

As shown in block 404, the CVE analyzer utilizes a Natural Language Processing (NLP) system that evaluates the contents and context of the CVE information into affected vendors, products, ports, protocols, related CWE (attack patterns), actions, and impact (see block 305 in FIG. 3B). For example, assume that the CVE indicates that the vulnerability is in Program A ("product"), written by Software Company A ("vendors"), and makes Port 1 ("ports") on a router vulnerable to certain types of malicious messages ("protocols"), as indicated by related attacks ("attack patterns"), causing the router to fail ("impact") unless steps are taken to cure the problem ("actions"). NLP looks for this information (e.g., by searching for certain key words/phrases) according to the context of the information (e.g., based on what type of system is vulnerable) in order to identify the type of vulnerability, what type of system is affected, etc. Thus, the CVE analyzer identifies a particular device (see block 406), a particular software (see block 408), a particular type of network (see block 409) that is affected by the CVE.

Furthermore, the CVE analyzer describes the CVE (see block 410), which NLP uses to generate a rule for responding to this type of vulnerability. For example, if a message using the protocol "http(s)", coming from any source and addressed to any location, is received by port "4321" on a type of router such as Router A, then that message is dropped (see block 418).

The CVA analyzer also identifies a general type of weakness (CWE) associated with the CVE (see block 412). That is, the CWE describes a type of weakness/vulnerability, but not the specific instance of the weakness/vulnerability (i.e., the CVE). For example, if lack of protection for input/output (I/O) interfaces on routers is the weakness for the routers (CWE), then an exposed particular port on a particular type of router is that particular router's vulnerability (CVE).

Once the type of vulnerable computer resource(s) are identified (e.g., routers made by a certain manufacturer), a customer profile scan identifies affected products, vendors and customers, as shown in block 414. This information is sent to the system as shown in block 416, which identifies a particular customer/user/etc. that has or uses the affected products. The identity of this particular customer/user/etc. is sent to the system along with the network rule from block 418, in order to determine is this particular customer/user/etc. is impacted by the rule shown in block 418. That is, the system determines (in block 420) whether the rule shown in block 418 is appropriate ("exploitable") for this particular customer/user/etc. based on that particular customer/user/etc. having/using the affected product(s), If not ("No"), then the system waits until an affected customer/user/etc. presents itself. If so ("Yes"), then the protection rule template generator (see the protection rule template generator 309 in FIG. 3B) composes a protection rule for the affected customer/user/etc. based on information received from the CVE analyzer, as shown in block 422. This protection rule is specific for a particular vendor and/or computer resource. The system then adds relevant log sources, network information, asset information for each affected customer/user/etc.

As described in block 424, the policy enforcement engine (e.g., policy enforcement engine 319 shown in FIG. 3B) enforces the protection rule against the affected products. That is, at this point, the policy enforcement engine initiates an intermediate process to protect the affected products until a fully tested patch is released. For example, if the CVE shows that Port 4321 on Router A is vulnerable to attack, the policy enforcement engine will drop (block) any messages detected by Port 4321 on Router A. This action is an "intermediate" solution that protects the Router A, but at the cost of reducing the capability of Router A (since Router A cannot receive messages on Port 4321 for now).

The policy enforcement engine then starts a process for monitoring for patch releases. That is, once a patch has been fully tested (see block 323 in FIG. 3A), it is installed on the affected computer resource, as described in block 426. That is, the policy enforcement engine reverses protection rule enablement (e.g., reopens Port 4321 on Router A to again receive messages) as soon as the patch is released and applied (installed) on the affected product (e.g., software that controls Router A). The policy enforcement engine then notifies the customer at each instance of rule application and reversal, as also described in block 426.

Figure 5:
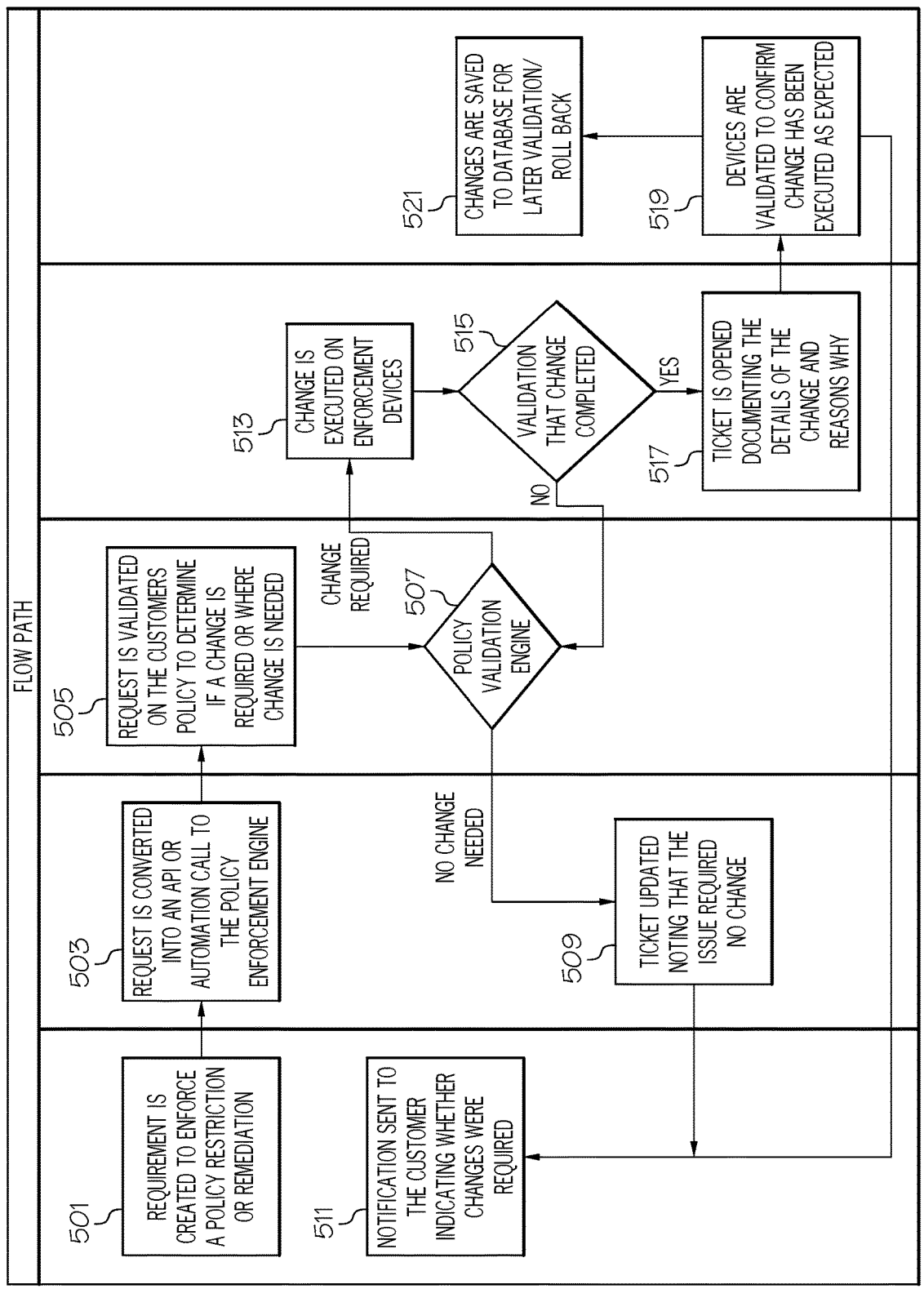
FIG. 5 depicts a high-level flow path for implementing an intermediate mitigation solution to a resource vulnerability in accordance with one or more embodiments of the present invention.

With reference now to FIG. 5, a high-level overview of implementing the intermediate measure to protect a vulnerable computer resource in accordance with one or more embodiments of the present invention is depicted. As shown in initiator block 501, a requirement is created to enforce a policy restriction or remediation. For example, the system receives a new CVE, thus establishing a requirement that the affected computer resource (e.g., a network router) be limited in its abilities or else fixed.

As shown in block 503, an application program interface (API) is created, or a call to the system is made, in order to start the process of a policy enforcement engine addressing the new CVE.

As shown in block 505, the request/API/call is validated according to a policy of a particular customer/owner of the affected computer resource by determining whether a change to the affected computer resource is needed. If not (query block 507), then the ticket created in block 505 is updated to show that no action is needed (block 509), and the customer is so notified (block 511). However, if an intermediate measure is needed to protect the affected computer resource until a permanent solution is implemented (e.g., a software patch), then (query block 507) the intermediate measure is implemented (e.g., shutting down or reducing the capabilities of the affected computer resource), as shown in block 513.

If the intermediate measure has not occurred (query block 515), then the process reverts back to query bock 507. However, if the intermediate measure has occurred (query block 515), then a ticket is opened and the intermediate measures are implemented on the affected computer resource (block 517). A shown in block 519, a confirmation is established that the intermediate measure has been implemented and is effective in protecting the affected computer resource from the vulnerability, and the changes to the affected computer resources are noted in a database of changes for the affected computer resource and/or other computer resources, as shown in block 521.

Figure 6:
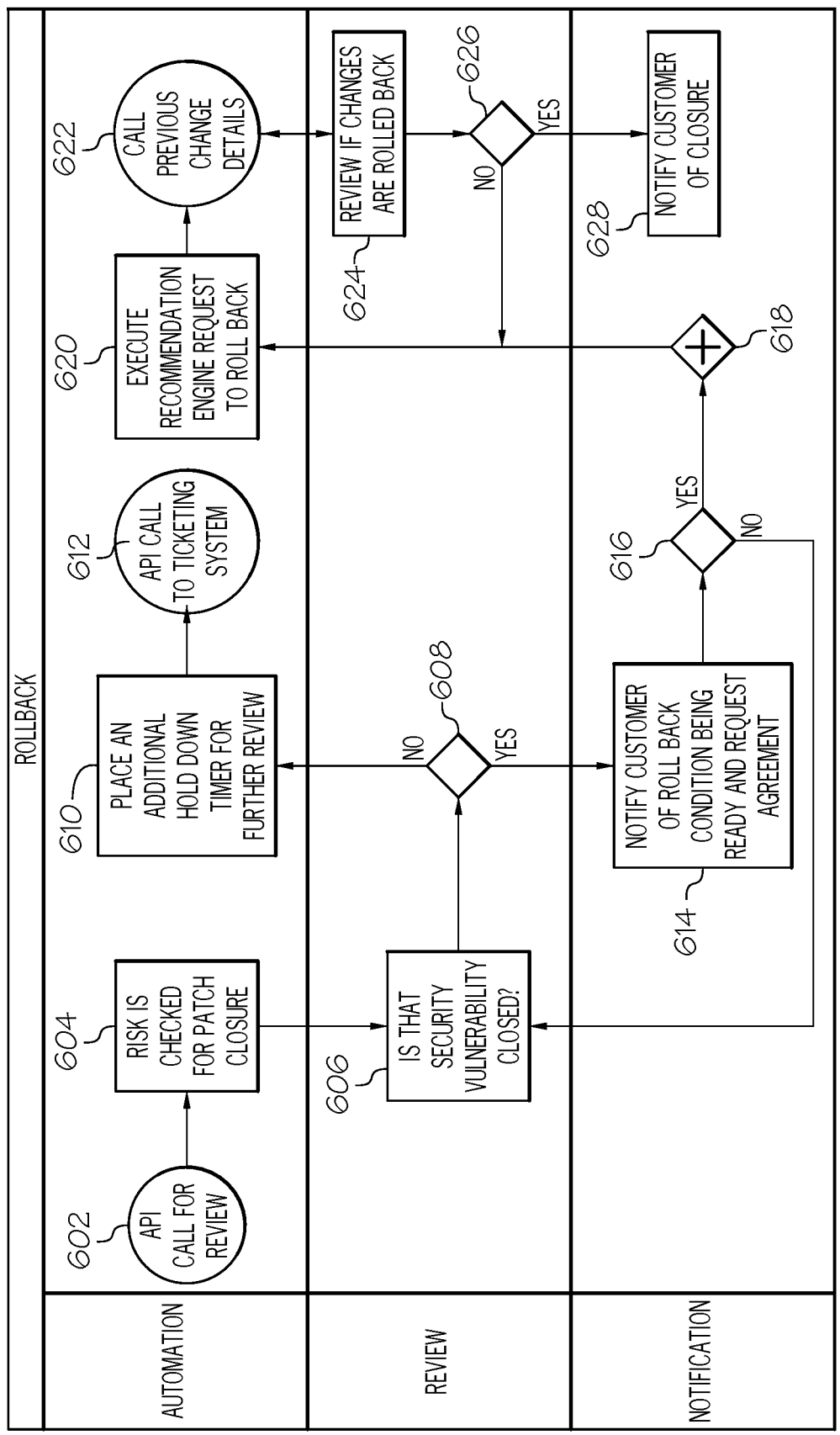
FIG. 6 illustrates a high-level flow path of rolling back the intermediate mitigation solution shown in FIG. 5.

As depicted in FIG. 6, a high-level overview of rolling back the intermediate measure previously taken to protect the affected computer resource is depicted in accordance with one or more embodiments of the present invention.

As shown in block 602, a call (e.g., by the API created in FIG. 5) is called (e.g., by policy enforcement engine 319 shown in FIG. 3B). As shown in block 604, the system monitors for the release and installation of a patch that corrects the vulnerability (but without compromising the functionality of the affected computer resource, which occurred in one or more embodiments when the intermediate measure was implemented). This check is made (block 606). If the patch has not been released and/or installed (query block 608), then operations of the affected computer resource continue to be restricted by the intermediate measure (block 610), and an API call is made to the ticketing system directing the affected computer resource to continue to be under the intermediate measure (block 612).

However, if the patch has been released (query block 608), then the owner/customer/user of the affected computer resource is notified that the patch is available (block 614). If this notification does not occur (query block 616, then the process returns to block 606. However, if the notification does occur (query block 616 and condition block 618), then a recommendation engine request is sent to the policy enforcement engine 319 shown in FIG. 3B to request that the intermediate measure be terminated (block 620). The policy enforcement engine 319 then calls for previous change details (block 622) shown in block 521 in FIG. 5. A review of whether the changes have been rolled back are then made (block 624). If not (query block 626), then the process reverts back to block 620). However, if so (query block 626), then the customer/owner/user of the affected computer resource is notified that patch has been installed and the intermediate measure terminated, as shown in block 628.

As described herein, machine learning is used to generate a protection rule template (see block 309 in FIG. 3B) and/or to identify computer resources that are affected by a vulnerability (see block 302 in FIG. 3B) in one or more embodiments of the present invention. In one or more embodiments of the present invention, this machine learning is achieved through the use of the neural network 124 shown in FIG. 1. In various embodiments of the present invention, neural network 124 is a Traditional Neural Network (TNN) such as a Recurrent Neural Network (RNN), a Convolutional Neural Network (CNN), or any other machine learning system.

A neural network (NN), as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a Traditional Neural Network (TNN), neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 7:
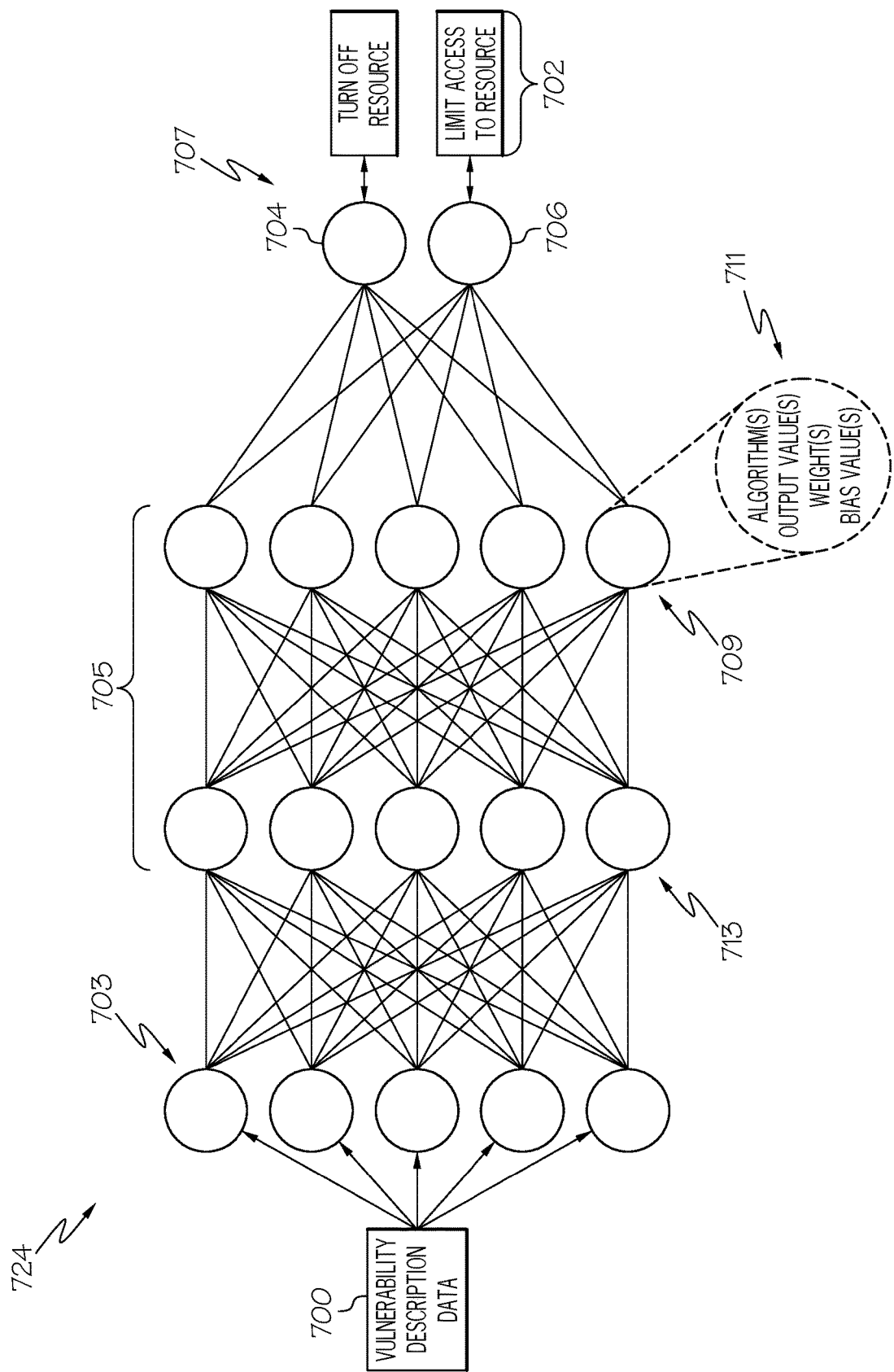
FIG. 7 depicts an exemplary Recurrent Neural Network (RNN) as used in one or more embodiments of the present invention.

With reference now to FIG. 7, a type of TNN known as a Recurrent Neural Network (RNN) 424 used to generate a protection rule template (see block 309 in FIG. 3B) and/or to identify computer resources that are affected by a vulnerability (see block 302 in FIG. 3B) in one or more embodiments of the present invention is presented.

The electronic neurons in RNN 724 are arranged in layers, known as an input layer 703, hidden layers 705, and an output layer 707. The input layer 703 includes neurons/nodes that take input data, and send it to a series of hidden layers of neurons (e.g., hidden layers 705), in which neurons from one layer in the hidden layers are interconnected with all neurons in a next layer in the hidden layers 705. The final layer in the hidden layers 705 then outputs a computational result to the output layer 707, which is often a single node for holding vector information.

The output of the RNN 724 is a particular response to a particular CVE, an identity/description of a particular CVE, etc. For purposes of illustration, FIG. 7 shows RNN 724 being used to generate a particular protection rule template. As such and in this example, each neuron in the output layer 707 is associated with a particular protection rule template 702, as shown in FIG. 7.

As just mentioned, each node in the depicted RNN 724 represents an electronic neuron, such as the depicted neuron 709. As shown in block 711, each neuron (including neuron 709) functionally includes at least four features: an algorithm, an output value, a weight, and a bias value.

The algorithm is a mathematic formula for processing data from one or more upstream neurons. For example, assume that one or more of the neurons depicted in the middle hidden layers 705 send data values to neuron 709. Neuron 709 then processes these data values by executing the algorithm shown in block 711, in order to create one or more output values, which are then sent to another neuron, such as another neuron within the hidden layers 705 or a neuron in the output layer 707. Each neuron also has a weight that is specific for that neuron and/or for other connected neurons. Furthermore, the output value(s) are added to bias value(s), which increase or decrease the output value, allowing the CNN 724 to be further "fine tuned".

For example, assume that neuron 713 is sending the results of its analysis of a piece of data to neuron 709. Neuron 709 has a first weight that defines how important data coming specifically from neuron 713 is. If the data is important, then data coming from neuron 713 is weighted heavily, and/or increased by the bias value, thus causing the algorithm(s) within neuron 709 to generate a higher output, which will have a heavier impact on neurons in the output layer 707. Similarly, if neuron 713 has been determined to be significant to the operations of neuron 709, then the weight in neuron 713 will be increased, such that neuron 709 receives a higher value for the output of the algorithm in the neuron 713. Alternatively, the output of neuron 709 can be minimized by decreasing the weight and/or bias used to affect the output of neuron 709. These weights/biases are adjustable for one, some, or all of the neurons in the RNN 724, such that a reliable output will result from output layer 707. Such adjustments are alternatively performed manually or automatically.

When manually adjusted, the weights are adjusted by the user in a repeated manner until the output from output layer 707 matches expectations. For example, assume that input layer 703 receives inputs that describe the CVE. In an exemplary input, the input vulnerability description data 700 to input layer 703 contains values that describe the CVE. If RNN 724 has been properly trained (by adjusting the algorithm(s), output value(s), weight(s), and biases in one or more of the electronic neurons within RNN 724) to output a 2-tuple output vector (e.g., 0.9, 0.2) to the output layer 707, indicating that the neuron 704 that is associated with the protection rule template ("Turn off resource") has the highest value (0.9), thus indicating that this is the appropriate response (as determined by the RNN 724) to the CVE described by the input vulnerability description data 700. However, the RNN 724 is also trained to give a value of 0.2 to neuron 706, indicating that "Limit access to resource" is an improper response to the CVE described by the vulnerability description data 700 that describes the CVE and is used as the input to the trained RNN 724. In order to make the RNN 724 properly output such values to the output layer 707, multiple neurons in the input layer 703 and/or hidden layers 705 are manually adjusted (e.g., the algorithm is manually changed, the weights and bias values are manually adjusted, etc.) until the correct values are output in the output layer 707. This "manual" adjustment can be achieved by a user actually directing the neurons to change certain parameters until optimal results occur.

When automatically adjusted, the weights (and/or algorithms) are adjusted using "back propagation", in which algorithms and/or weight values of the neurons are adjusted by using a "gradient descent" method that determines which direction each algorithm/weight value should be adjusted to. This gradient descent process moves the algorithm/weight in each neuron in a certain direction until the output from output layer 707 improves (e.g., gets closer to outputting a highest value to neuron 704, thus indicating that "Turn off resource" is the best response to the particular CVE).

Figure 8:
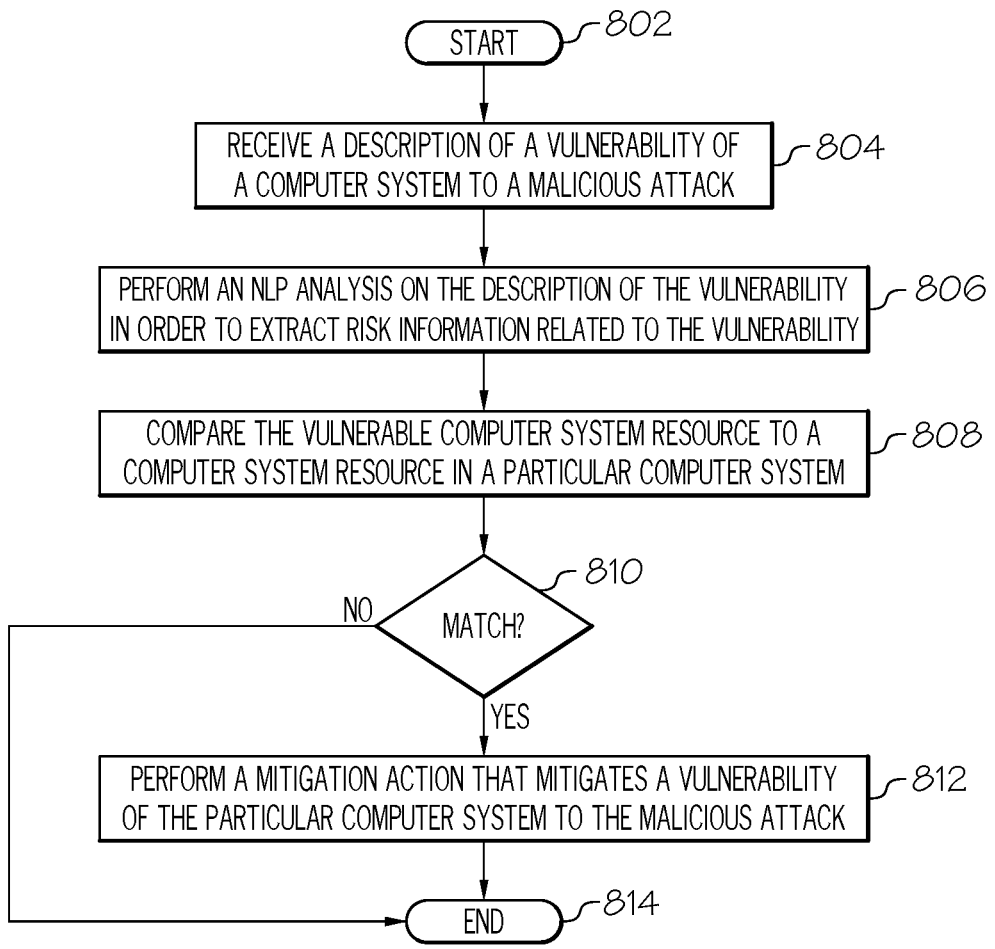
FIG. 8 is a high-level flow chart of one or more steps performed in accordance with one or more embodiments of the present invention.

With reference now to FIG. 8, a high-level flow chart of one or more embodiments of the present invention is presented.

After initiator block 802, one or more processors (e.g., processor 104 shown in FIG. 1) receive a description of a vulnerability of a computer system to a malicious attack (e.g., a CVE), as described in block 804. The CVE identifies a particular type of computer system, rather than a particular computer system, that is vulnerable to malicious attack.

As described in block 806, the processor(s) perform a Natural Language Processing (NLP) analysis of the description of the vulnerability in order to extract risk information related to the vulnerability. In one or more embodiments of the present invention, the risk information includes an identity of a type of vulnerable computer system resource in the computer system that is vulnerable to the malicious attack. For example, the risk information can state that ports in a network router that are controlled by Version 2.0 of Software A from Vendor A are vulnerable to malicious attacks.

As described in block 808, the processor(s) compare the vulnerable computer system resource to a computer system resource in a particular computer system. For example, the processor(s) determine whether a particular computer system has a network router that is controlled by Version 2.0 of Software A from Vendor A.

In response to the vulnerable computer system resource matching the computer system resource in the particular computer system (query block 810), the processor(s) perform a mitigation action that mitigates a vulnerability of the computer system resource in the particular computer system to the malicious attack, as described in block 812. This mitigation action is an intermediate process that reduces a functionality of the computer system resource in the particular computer system (e.g., shuts down a specific network server port) until a solution is implemented (e.g., a patch is installed) that mitigates the vulnerability of the particular computer system to the malicious attack (e.g., in a manner that has been fully tested and is permanent) and/or restores the functionality of the computer system resource in the particular computer system.

The flow-chart ends at terminator block 814.

In an embodiment of the present invention, the vulnerability of the computer system to the malicious attack is from a set of newly-identified vulnerabilities. As described herein, the set of newly-identified vulnerabilities are identified in a Common Vulnerability Exposure (CVE) listing that is generated by a third party that monitors vulnerabilities for multiple computer systems (see CVE provider system 352 in FIG. 3B).

In an embodiment of the present invention, the processor(s) autonomously develop the mitigation action based on a protection rule template for responding to the vulnerability of the computer system to the malicious attack. For example, if the protection rule template states "If port 4321 on Router A receives a message, drop that message", then the mitigation action can be to disable port 4321.

In an embodiment of the present invention, the processor(s) and/or a user inputs the description of the vulnerability of the computer system to the malicious attack (e.g., based on the CVE) into a Recurrent Neural Network (RNN). As described in FIG. 7, the processor(s) (using back propagation against the electronic neurons) and/or user (making manual adjustments of the electronic neurons) trains the RNN to generate the protection rule template based on the description of the vulnerability to the malicious attack.

In an embodiment of the present invention, the mitigation action is from a set of mitigation actions that include changing an access control list for access to the computer system resource in the particular computer system, changing a host-based agent for handling messages to the computer system resource in the particular computer system, and changing a configuration of the computer system resource in the particular computer system. For example, assume that the vulnerable computer system resource is a network router. As such, an exemplary mitigation action is to limit what users and/or devices are allowed to access that network router ("changing an access control list for access to the computer system resource in the particular computer system). Another exemplary mitigation action is to re-route messages to the vulnerable port on that particular network router to a different network router ("changing a host-based agent for handling messages to the computer system resource in the particular computer system"). Another exemplary mitigation action is to re-route messages to the vulnerable port on that particular network router to another port on that particular network router ("changing a configuration of the computer system resource in the particular computer system).

In an embodiment of the present invention, the processor(s) receive a vendor patch for the vulnerability of the particular computer system to the malicious attack; apply the vendor patch for the vulnerability to the particular computer system to the malicious attack; and, in response to applying the vendor patch for the vulnerability to the particular computer system, cease/remove the mitigation action for the respective vulnerability from the particular computer system (see FIGS. 3-6).

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
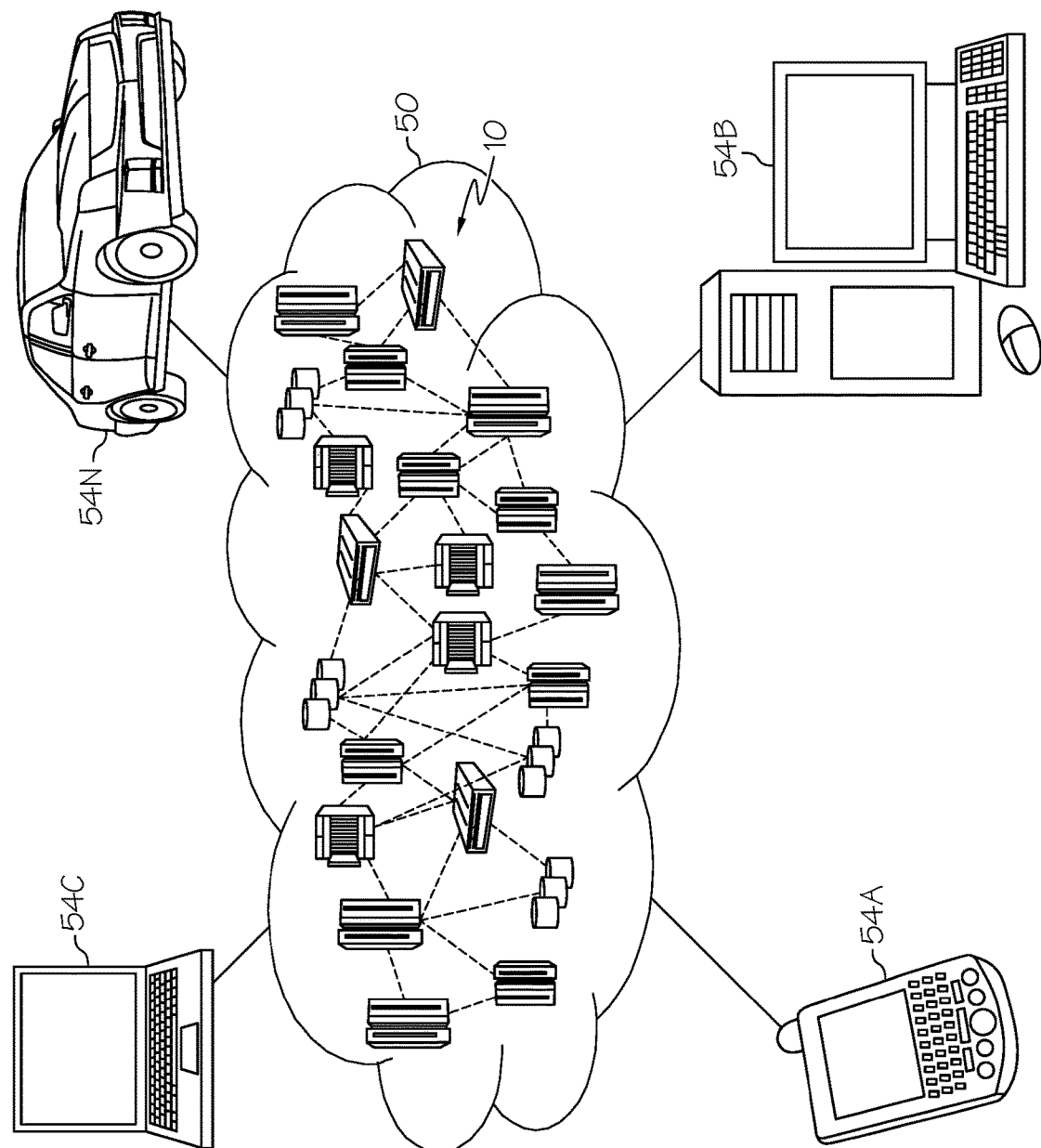
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
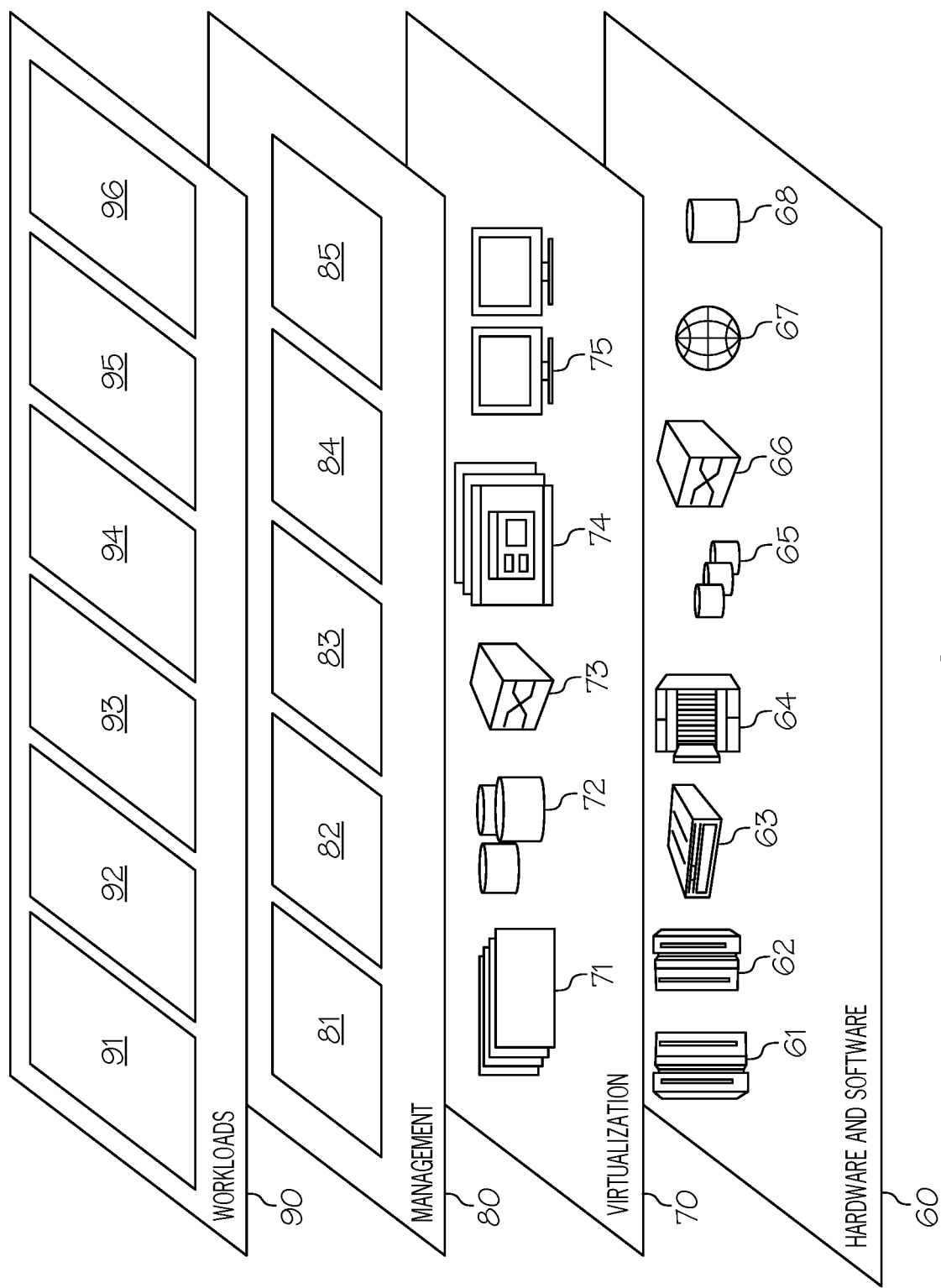
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and vulnerability response processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
  receiving, by one or more processors, a description of a vulnerability of a computer system hardware resource in a computer system to a malicious attack, wherein the vulnerability of the computer system to the malicious attack is from a set of newly-identified vulnerabilities, and wherein the set of newly-identified vulnerabilities are identified in a Common Vulnerability Exposure (CVE) listing that is generated by a third party that monitors vulnerabilities for multiple computer systems;
  performing, by the one or more processors, a Natural Language Processing (NLP) analysis of the description of the vulnerability in order to extract risk information related to the vulnerability, wherein the risk information comprises an identity of a type of vulnerable computer system hardware resource in the computer system that is vulnerable to the malicious attack;
  comparing, by the one or more processors, the vulnerable computer system hardware resource to a computer system hardware resource in a particular computer system; and
  in response to the vulnerable computer system hardware resource matching the computer system hardware resource in the particular computer system, performing, by the one or more processors, a mitigation action that mitigates a vulnerability of the computer system hardware resource in the particular computer system to the malicious attack by reducing a functionality of the computer system hardware resource in the particular computer system until a solution is implemented that mitigates the vulnerability of the particular computer system to the malicious attack, wherein the mitigation action causes intermediate changes to the computer system hardware resource between a time that the CVE is released and a time that a vendor provides a patch to close the vulnerability of the computer system, and wherein the intermediate changes comprise limiting what devices are allowed to access the computer system, changing passwords required to access the computer system, changing a hardware configuration of the computer system, and applying a patch that stops access to the computer system.

2. The method of claim 1, wherein the solution that mitigates the vulnerability of the particular computer system to the malicious attack also restores the functionality of the computer system hardware resource in the particular computer system.

3. The method of claim 1, further comprising:
inputting the description of the vulnerability of the computer system to the malicious attack into a Recurrent Neural Network (RNN), wherein neurons in the RNN process data from upstream neurons in the RNN by executing one or more algorithms; and
training the RNN to generate the protection rule template based on the description of the vulnerability to the malicious attack.

4. The method of claim 1, wherein the mitigation action further comprises changing an access control list for access to the computer system hardware resource in the particular computer system, changing a host-based agent for handling messages to the computer system hardware resource in the particular computer system, and changing a configuration of the computer system hardware resource in the particular computer system.

5. The method of claim 1, further comprising:
receiving, by the one or more processors, a vendor patch for the vulnerability of the particular computer system to the malicious attack;
applying, by the one or more processors, the vendor patch for the vulnerability to the particular computer system; and
in response to applying the vendor patch for the vulnerability to the particular computer system, ceasing, by the one or more processors, the mitigation action from the particular computer system.

6. The method of claim 1, wherein the mitigation action disables the functionality of the computer system hardware resource until the functionality of the computer system hardware resource in the particular computer system is restored, wherein the computer system is a server, wherein the computer system hardware resource is a specific network server port on the server, and wherein the specific network server port is shut down until the patch is released and installed on the server to overcome the malicious attack.

7. The method of claim 1, further comprising:
performing, by the one or more processors, an NLP analysis of the CVE listing in order to identify the type of vulnerable computer system hardware resource, the particular computer system, and a particular type of network that are affected by the malicious attack described in the CVE listing; and
utilizing, by the one or more processors, the NLP analysis of the CVE listing to generate a rule for responding to the malicious attack on the vulnerable computer system hardware resource in the particular computer system.

8. The method of claim 1, wherein the vulnerable computer system hardware resource is a router.

9. A computer program product comprising a computer readable storage medium having program code embodied therewith, wherein the computer readable storage medium is not a transitory signal per se, and wherein the program code is readable and executable by a processor to perform a method comprising:
receiving a description of a vulnerability of computer system hardware resource in a computer system to a malicious attack, wherein the vulnerability of the computer system to the malicious attack is from a set of newly-identified vulnerabilities, and wherein the set of newly-identified vulnerabilities are identified in a Common Vulnerability Exposure (CVE) listing that is generated by a third party that monitors vulnerabilities for multiple computer systems;
performing a Natural Language Processing (NLP) analysis of the description of the vulnerability in order to extract risk information related to the vulnerability, wherein the risk information comprises an identity of a type of vulnerable computer system hardware resource in the computer system that is vulnerable to the malicious attack;
comparing the vulnerable computer system hardware resource to a computer system hardware resource in a particular computer system; and
in response to the vulnerable computer system hardware resource matching the computer system hardware resource in the particular computer system, performing a mitigation action that mitigates a vulnerability of the computer system hardware resource in the particular computer system to the malicious attack by reducing a functionality of the computer system hardware resource in the particular computer system until a solution is implemented that both restores the functionality of the computer system hardware resource in the particular computer system and mitigates the vulnerability of the particular computer system to the malicious attack, wherein the mitigation action causes intermediate changes to the computer system hardware resource between a time that the CVE is released and a time that a vendor provides a patch to close the vulnerability of the computer system, and wherein the intermediate changes comprise limiting what devices are allowed to access the computer system, changing passwords required to access the computer system, changing a hardware configuration of the computer system, and applying a patch that stops access to the computer system.

10. The computer program product of claim 9, wherein the method further comprises:
autonomously developing the mitigation action based on a protection rule template for responding to the vulnerability of the computer system to the malicious attack;
inputting the description of the vulnerability of the computer system to the malicious attack into a Recurrent Neural Network (RNN), wherein neurons in the RNN process data from upstream neurons in the RNN by executing one or more algorithms; and
training the RNN to generate the protection rule template based on the description of the vulnerability to the malicious attack.

11. The computer program product of claim 9, wherein the mitigation action further comprises changing an access control list for access to the computer system hardware resource in the particular computer system, changing a host-based agent for handling messages to the computer system hardware resource in the particular computer system, and changing a configuration of the computer system hardware resource in the particular computer system.

12. The computer program product of claim 9, wherein the method further comprises:
- receiving a vendor patch for the vulnerability of the particular computer system to the malicious attack;
- applying the vendor patch to the particular computer system; and
- in response to applying the vendor patch to the particular computer system, ceasing the mitigation action on the particular computer system.

13. The computer program product of claim 9, wherein the program instructions are provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
- receiving a description of a vulnerability of computer system hardware resource in a computer system to a malicious attack, wherein the vulnerability of the computer system to the malicious attack is from a set of newly-identified vulnerabilities, and wherein the set of newly-identified vulnerabilities are identified in a Common Vulnerability Exposure (CVE) listing that is generated by a third party that monitors vulnerabilities for multiple computer systems;
- performing a Natural Language Processing (NLP) analysis of the description of the vulnerability in order to extract risk information related to the vulnerability, wherein the risk information comprises an identity of a type of vulnerable computer system hardware resource in the computer system that is vulnerable to the malicious attack;
- comparing the vulnerable computer system hardware resource to a computer system hardware resource in a particular computer system; and
- in response to the vulnerable computer system hardware resource matching the computer system hardware resource in the particular computer system, performing a mitigation action that mitigates a vulnerability of the computer system hardware resource in the particular computer system to the malicious attack by reducing a functionality of the computer system hardware resource in the particular computer system until a solution is implemented that both restores the functionality of the computer system hardware resource in the particular computer system and mitigates the vulnerability of the particular computer system to the malicious attack, wherein the mitigation action causes intermediate changes to the computer system hardware resource between a time that the CVE is released and a time that a vendor provides a patch to close the vulnerability of the computer system, and wherein the intermediate changes comprise limiting what devices are allowed to access the computer system, changing passwords required to access the computer system, changing a hardware configuration of the computer system, and applying a patch that stops access to the computer system.

15. The computer system of claim 14, wherein the method further comprises:
- autonomously developing the mitigation action based on a protection rule template for responding to the vulnerability of the computer system to the malicious attack.

16. The computer system of claim 14, wherein the program instructions are provided as a service in a cloud environment.

* * * * *